(12) United States Patent
Ishiwari

(10) Patent No.: US 10,474,127 B2
(45) Date of Patent: Nov. 12, 2019

(54) NUMERICAL CONTROLLER

(71) Applicant: FANUC CORPORATION, Minamitsuru-gun, Yamanashi (JP)

(72) Inventor: Hisateru Ishiwari, Yamanashi (JP)

(73) Assignee: Fanuc Corporation, Yamanashi (JP)

(*) Notice: Subject to any disclaimer, the term of this patent is extended or adjusted under 35 U.S.C. 154(b) by 25 days.

(21) Appl. No.: 15/785,930

(22) Filed: Oct. 17, 2017

(65) Prior Publication Data

US 2018/0113433 A1 Apr. 26, 2018

(30) Foreign Application Priority Data

Oct. 20, 2016 (JP) .................................. 2016-206329

(51) Int. Cl.
   *G05B 19/404* (2006.01)
   *G05B 19/4155* (2006.01)

(52) U.S. Cl.
   CPC ....... *G05B 19/404* (2013.01); *G05B 19/4155* (2013.01); *G05B 2219/31407* (2013.01);
   (Continued)

(58) Field of Classification Search
   CPC .............. G05B 19/404; G05B 19/4155; G05B 2219/31407; G05B 2219/35309;
   (Continued)

(56) References Cited

U.S. PATENT DOCUMENTS 5,528,506 A 6/1996 Yoshida et al.
5,815,400 A * 9/1998 Hirai .................... G05B 19/401
                                                       700/173
(Continued)

FOREIGN PATENT DOCUMENTS

DE 69229309 T2 11/1999
JP H 11-28643 A 2/1999
(Continued)

OTHER PUBLICATIONS

Journal of Technical Disclosure, publication No. 2012-502270, May 28, 2012.
(Continued)

*Primary Examiner* — Abdelmoniem I Elamin
(74) *Attorney, Agent, or Firm* — RatnerPrestia

(57) ABSTRACT

Prediction of a machining time at higher accuracy considering a machine delay generated in a machine is allowed by a numerical controller of the invention. The numerical controller includes a reference machining time prediction unit for predicting a reference machining time corresponding to a machining time not considering a delay time of servo control and machine motion based on the machining program, a program analysis unit for extracting a combination of at least one program command included in the machining program, a data storage unit for storing information related to an actual delay time of servo control and machine motion measured for each combination of program command types, a correction time calculation unit for calculating a correction time for correction of the reference machining time based on the combination of the program commands extracted by the program analysis unit and the information stored in the data storage unit, and a machining time prediction unit for calculating a predicted machining time obtained by correcting the reference machining time using the correction time.

2 Claims, 6 Drawing Sheets

(52) U.S. Cl.
CPC ........... *G05B 2219/35309* (2013.01); *G05B 2219/36219* (2013.01); *G05B 2219/37336* (2013.01); *G05B 2219/37518* (2013.01); *G05B 2219/41119* (2013.01)

(58) Field of Classification Search
CPC ........... G05B 2219/36219; G05B 2219/37336; G05B 2219/37518; G05B 2219/41119
See application file for complete search history.

(56) References Cited

U.S. PATENT DOCUMENTS

| | | | | |
|---|---|---|---|---|
| 6,728,657 | B2* | 4/2004 | Nakamura | G05B 19/406 |
| | | | | 700/174 |
| 7,027,889 | B2* | 4/2006 | Nakamura | G05B 19/4097 |
| | | | | 700/173 |
| 2003/0110006 | A1* | 6/2003 | Nakamura | G05B 19/406 |
| | | | | 702/176 |
| 2004/0204786 | A1* | 10/2004 | Nakamura | G05B 19/4097 |
| | | | | 700/159 |
| 2005/0228533 | A1* | 10/2005 | Hioki | G05B 19/4103 |
| | | | | 700/159 |
| 2012/0109359 | A1* | 5/2012 | Mizuno | G05B 19/41865 |
| | | | | 700/173 |
| 2012/0296462 | A1* | 11/2012 | Otsuki | G05B 19/4069 |
| | | | | 700/104 |
| 2017/0242408 | A1* | 8/2017 | Uchida | G05B 6/02 |
| 2018/0120819 | A1* | 5/2018 | Ishiwari | G05B 19/414 |

FOREIGN PATENT DOCUMENTS

| | | |
|---|---|---|
| JP | 2003-175439 A | 6/2003 |
| JP | 2004062613 A | 2/2004 |
| JP | 2012-243152 A | 12/2012 |
| JP | 2014-038482 A | 2/2014 |

OTHER PUBLICATIONS

Decision to Grant a Patent for Japanese Application No. 2016-206329, dated Apr. 3, 2018, including English translation, 6 pages.
German Examination Report for German Application No. 10 2017 009 751.8, dated Aug. 21, 2019 with translation, 10 pages.

* cited by examiner

FIG.3

| TIME (ms) | PROGRAM COMMAND | MOVEMENT AMOUNT FOR EACH CONTROL PERIOD | ERROR AMOUNT FOR EACH CONTROL PERIOD |
|---|---|---|---|
| 100 | G00 X10 | 200 | |
| 200 | | 200 | 5 |
| 300 | | 200 | 5 |
| 400 | | 200 | 5 |
| 500 | | | 5 |
| 600 | | | 2 |
| 700 | G01 X20 | 200 | |

TIME AT WHICH ONLY ERROR PULSE IS OUTPUT CORRESPONDS TO ACTUAL DELAY TIME OF SERVO CONTROL AND MACHINE MOTION GENERATED BETWEEN PROGRAM COMMANDS BEFORE AND AFTER TIME

FIG.4A

| COMBINATION OF PROGRAM COMMAND TYPES | CUMULATIVE ACTUAL DELAY TIME OF SERVO CONTROL AND MACHINE MOTION(ms) | NUMBER OF TIMES OF MEASUREMENTS (TIMES) |
|---|---|---|
| (G00, G01) | 21425 | 105 |
| (G01, G00) | 40314 | 221 |
| (G00, G00) | 6115 | 48 |
| ⋮ | ⋮ | ⋮ |

FIG.4B

| COMBINATION OF PROGRAM COMMAND TYPES | WORKPIECE WEIGHT (kg) | CUMULATIVE ACTUAL DELAY TIME OF SERVO CONTROL AND MACHINE MOTION (ms) | NUMBER OF TIMES OF MEASUREMENTS (TIMES) |
|---|---|---|---|
| (G00, G01) | 0～2.5 | 66111 | 405 |
| | 2.5～5.0 | 21425 | 105 |
| | 5.0～7.5 | 26934 | 88 |
| | ⋮ | ⋮ | ⋮ |
| (G01, G00) | 0～2.5 | 16344 | 112 |
| | 2.5～5.0 | 40314 | 221 |
| | ⋮ | ⋮ | ⋮ |
| ⋮ | ⋮ | ⋮ | ⋮ |

A COMBINATION OF PROGRAM COMMANDS EXTRACTED
FROM A MACHINING PROGRAM
1. (G00, T)
2. (T, G00)
3. (G00, G01)
4. (G01, G01)
5. G(01, G01)
    ⋮

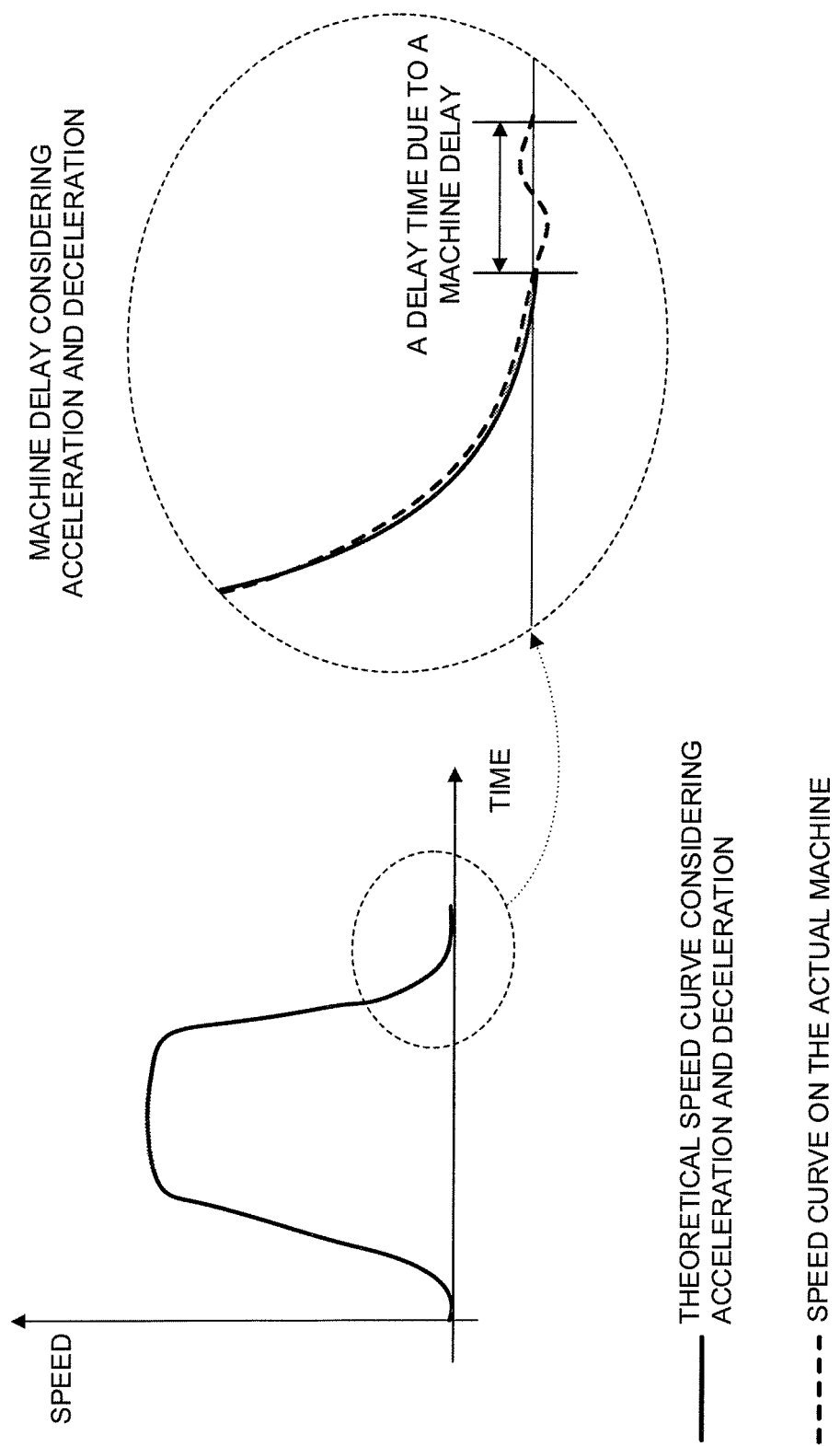

NUMERICAL CONTROLLER

BACKGROUND OF THE INVENTION

1. Field of the Invention

The present invention relates to a numerical controller, and particularly relates to a numerical controller having a machining time prediction function that takes servo control and machine motion delay into account.

2. Description of the Related Art

In a case in which a workpiece is machined using a machine tool, in general, machining accuracy becomes poor when a machining speed is increased to shorten a machining time. On the contrary, machining accuracy becomes excellent when the machining speed is decreased to lengthen the machining time. For this reason, a user who machines the workpiece using the machine tool desires to "machine the workpiece at machining accuracy within a preset allowable machining error in a machining time as short as possible". However, it is not easy to ascertain the extent of the machining time in which the workpiece may be machined and the extent of the machining error with which the workpiece may be machined at this time.

In this regard, various trials and errors have been repeated by attempting to shorten a machining time while maintaining machining accuracy by performing trial machining while changing setting of a parameter, etc. or by predicting machining accuracy and a machining time by performing simulation without performing trial machining.

Examples of a main conventional technology related to predicting a machining time include technologies disclosed in JP 2003-175439 A, JP 2012-243152 A, JP 11-028643 A, JP 2014-038482 A, and journal of technical disclosure No. 2012-502270. JP 2003-175439 A discloses a technology of accurately predicting a machining time by accumulating a time of an auxiliary function for each auxiliary code and reflecting an average value thereof in a predicted machining time. JP 2012-243152 A discloses a technology that allows more accurate machining time and machining error prediction by simulating servo operation. JP 11-028643 A discloses a technology of predicting a more accurate machining time than only a predicted machining time by measuring a time corresponding to actual machining during machining and adding a predicted machining time to the actual machining time. In addition, JP 2014-038482 A discloses a technology that allows accurate machining time prediction in consideration of acceleration and deceleration time and a program execution order by dividing a tool path into smaller units than a block referred to as a segment, and increasing and setting a segment travel time to a machining time in consideration of machining ability of the numerical controller. Further, in a technology disclosed in journal of technical disclosure No. 2012-502270, a machining time is predicted by calculating a delay due to acceleration and deceleration, a delay due to servo control, and a machine motion delay.

In general, when a machine is operated, an operation delay based on a frictional force generated in each part, a delay of a feedback system, an operation delay generated by inertia, etc. cause a so-called machine delay such as a delay due to acceleration and deceleration, a delay due to servo control, a machine motion delay, etc. (FIG. 6). However, the technologies disclosed in JP 2003-175439 A and JP 2012-243152 A do not consider such a machine delay, and thus has a problem that an error occurs in a machining time prediction result. In addition, in the technology disclosed in JP 11-028643 A, prediction accuracy is high near the end of machining. However, in the early stage of machining, a machine delay is not sufficiently reflected in a prediction result, and thus an error occurs in a machining time prediction result. Further, in the technologies disclosed in JP 2014-038482 A and journal of technical disclosure No. 2012-502270, even though it is suggested to calculate a machine delay time, a scheme of calculating a specific machine delay time is not disclosed. In addition, since a characteristic of a machine delay is different for each machine, even when a calculation scheme is disclosed, it is difficult to respond to all types of machine delays, and accurate prediction is not allowed.

In general, a machine delay increases when a control object is accelerated or decelerated. Therefore, a machining time is considered to be accurately predicted using a method of measuring a gap time between a predicted machining time and an actual machining time generated due to a machine delay in advance using an experiment, etc. and correcting the predicted machining time based on the measured gap time and the number of accelerations and decelerations in machining. However, in practice, a machine delay generated between two consecutive program commands included in a machining program (for example, a machine delay generated between a command G00 and a command G01 when the command G01 is executed after the command G00) is different according to a combination of two program command types (a combination involved with an order). Thus, there has been a problem that improvement in prediction accuracy of a machining time has limit even when the gap time is simply measured and used.

SUMMARY OF THE INVENTION

In this regard, an object of the invention is to provide a numerical controller that allows prediction of a machining time with higher accuracy in consideration of a machine delay generated in a machine.

In the invention, the above-mentioned problem is solved by providing a numerical controller with a configuration of calculating a more accurate machining time by sampling a movement amount and an error amount (position deviation amount) for each control period per unit time while performing actual machining on various combinations of program command types (combinations involved with orders) to obtain an actual delay time of servo control and machine motion in each of the combinations of the program command types and accumulate the obtained actual delay time as data, which is reflected in a simulation result of machining time prediction.

Further, a numerical controller according to the invention machines a workpiece by controlling a machine including at least one axis based on a machining program and includes a reference machining time prediction unit for predicting a reference machining time corresponding to a machining time not considering a delay time of servo control and machine motion based on the machining program, a program analysis unit for extracting a combination of at least one program command included in the machining program by analyzing the machining program, a data storage unit for storing information related to an actual delay time of servo control and machine motion measured in actual machining by the machine for each combination of program command types, a correction time calculation unit for calculating a correction time for correction of the reference machining time based on the combination of the program commands extracted by the program analysis unit and information related to an actual delay time of servo control and machine motion for each of the combination of the program command types stored in the data storage unit, and a machining time prediction unit for calculating a predicted machining time obtained by correcting the reference machining time using the correction time.

The above numerical controller of the invention further includes an actual machining delay time measurement unit for measuring an actual delay time of servo control and machine motion for each combination of program commands and updating the information related to the actual delay time of servo control and machine motion for each combination of the program command types stored in the data storage unit based on the measured actual delay time of servo control and machine motion for each combination of program commands.

In the above numerical controller of the invention, the correction time calculation unit calculates the correction time by estimating a delay time of servo control and machine motion with regard to each combination of the program commands extracted by the program analysis unit based on the information related to the actual delay time of servo control and machine motion for each combination of the program command types stored in the data storage unit and integrating each estimated delay time of servo control and machine motion.

According to the invention, it is possible to predict a machining time at higher accuracy in consideration of a characteristic of a machine tool such as a delay of servo control and machine motion.

BRIEF DESCRIPTION OF THE DRAWINGS

The above-described object and characteristic of the invention and other objects and characteristics will be clear from description of embodiments below with reference to accompanying drawings. In the drawings:

FIG. 3 is a diagram for description of a method of measuring an actual delay time of servo control and machine motion by an actual machining delay time measurement unit;

FIG. 4A is a diagram illustrating an example of an actual delay time of servo control and machine motion for each combination of program command types stored in a data storage unit;

FIG. 4B is a diagram illustrating an example of an actual delay time of servo control and machine motion for each combination of program command types for each workpiece weight stored in the data storage unit;

FIG. 6 is a diagram for description of a machine delay.

DETAILED DESCRIPTION OF THE PREFERRED EMBODIMENTS

Hereinafter, embodiments of the invention will be described with reference to drawings.

A numerical controller of the invention samples a movement amount and an error amount (position deviation amount) for each control period per unit time while performing actual machining on various combinations of program command types (combinations involved with orders) in advance to store an actual delay time of servo control and machine motion in each of the combinations of the program command types as data in a data storage unit. Then, when a time related to machining by a machining program is predicted, a delay time of servo control and machine motion generated between respective program commands is estimated based on data stored in the data storage unit for each combination of the respective program commands included in the machining program by analyzing the machining program, and a predicted machining time is corrected based on the estimated delay time of servo control and machine motion for each combination of the respective program commands.

Figure 1:
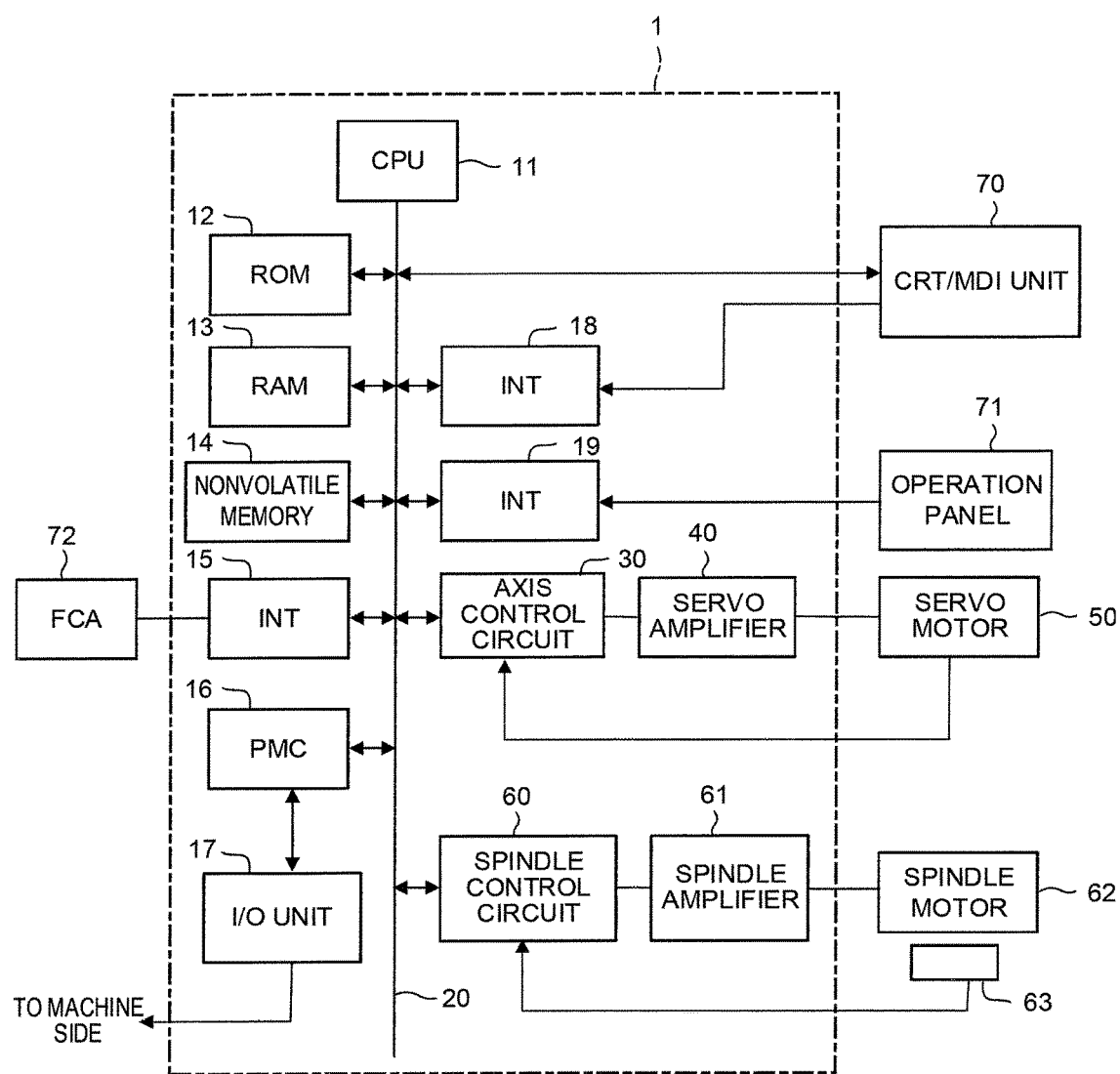
FIG. 1 is a hardware configuration diagram illustrating a main part of a numerical controller according to an embodiment of the invention.

FIG. 1 is a hardware configuration diagram illustrating a main part of a numerical controller and a machine tool driven and controlled by the numerical controller according to an embodiment of the invention. A central machining unit (CPU) 11 included in the numerical controller 1 is a processor that generally controls the numerical controller 1. The CPU 11 reads a system program stored in a read only memory (ROM) 12 through a bus 20, and controls the entire numerical controller 1 according to the system program. A random access memory (RAM) 13 stores temporary calculation data, display data, various data input by an operator through a cathode ray tube (CRT)/manual data input (MDI) unit 70, etc.

A nonvolatile memory 14 is configured as a memory that is kept in a storage state even when power of the numerical controller 1 is turned OFF, for example, by being backed up by a battery (not illustrated). The nonvolatile memory 14 stores a machining program read through an interface 15 and a machining program input through the CRT/MDI unit 70 described below. The nonvolatile memory 14 further stores a machining program operation machining program used for operating the machining program, a machining time prediction machining program, etc., which are developed in the RAM 13 at the time of execution. In addition, various system programs for executing machining in editing mode, etc. required for creating and editing a machining program are written to the ROM 12 in advance.

The interface 15 is an interface for connecting the numerical controller 1 and an external device 72 such as an adapter. A machining program, various parameters, etc. are read from the external device 72 side. In addition, the machining program edited in the numerical controller 1 can be stored in external storage means through the external device 72. A programmable machine controller (PMC) 16 outputs a signal to a periphery device of the machine tool (for example, an actuator such as a tool exchange robot hand) through an input/output (I/O) unit 17 to perform a control operation by a sequence program built in the numerical controller 1. In addition, the PMC 16 receives signals of various switches of an operation panel provided in a main body of the machine tool, performs necessary signal machining, and then passes the signals to the CPU 11.

The CRT/MDI unit 70 is a manual data input device having a display, a keyboard, etc. An interface 18 receives a command and data from the keyboard of the CRT/MDI unit 70 and passes the command and the data to the CPU 11. An interface 19 is connected to an operation panel 71 having a manual pulse generator, etc.

An axis control circuit 30 for controlling an axis included in the machine tool receives a movement command amount of the axis from the CPU 11 and outputs a command for the axis to a servo amplifier 40. In response to receiving this command, the servo amplifier 40 drives a servo motor 50 that moves the shift included in the machine tool. The servo motor 50 of the axis incorporates a position/speed detector, feeds a position/speed feedback signal from the position/speed detector back to the axis control circuit 30, and performs position/speed feedback control.

One axis control circuit 30, one servo amplifier 40, and one servo motor 50 are illustrated in the hardware configuration diagram of FIG. 1. However, in practice, axis control circuits 30, servo amplifiers 40, and servo motors 50 corresponding to the number of axes included in the machine tool are prepared.

A spindle control circuit 60 receives a spindle rotation command to the machine tool and outputs a spindle speed signal to a spindle amplifier 61. In response to receiving this spindle speed signal, the spindle amplifier 61 rotates a spindle motor 62 of the machine tool at a commanded rotational speed to drive the tool.

A position coder 63 is coupled to the spindle motor 62 by a gear, a belt, etc., the position coder 63 outputs a feedback pulse in synchronization with rotation of a spindle, and the feedback pulse is read by the CPU 11.

Figure 2:
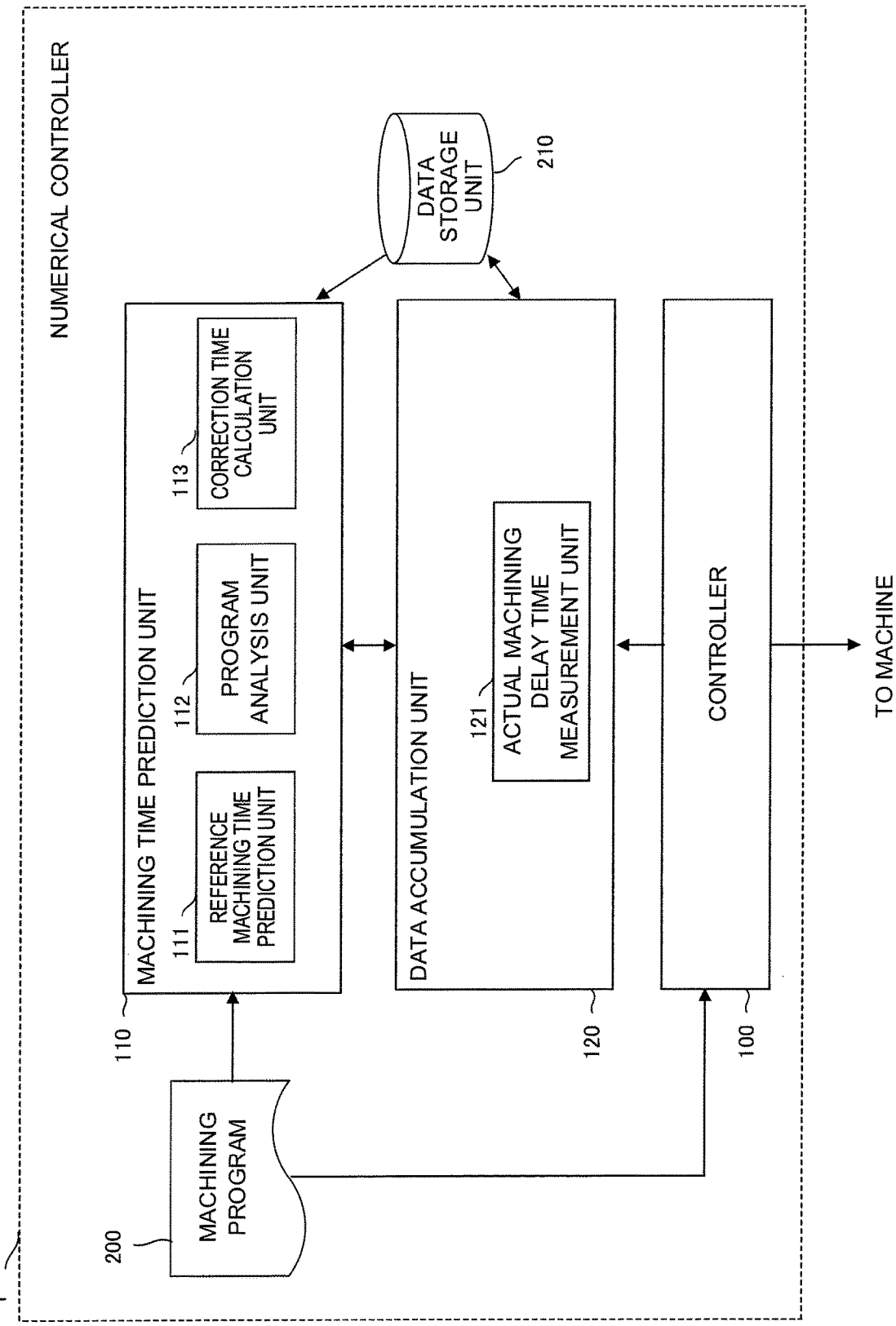
FIG. 2 is a schematic function block diagram of the numerical controller according to an embodiment of the invention.

FIG. 2 illustrates a schematic function block diagram according to an embodiment in a case in which a machining time prediction function according to machining performed based on a machining program provided by the invention is implemented to the numerical controller 1 illustrated in FIG. 1 by a system program. Each functional means illustrated in FIG. 2 is implemented when the CPU 11 illustrated in FIG. 1 executes the system program to provide each function. The numerical controller 1 of the present embodiment includes a controller 100, a machining time prediction unit 110, and a data accumulation unit 120.

The controller 100 sequentially reads and analyzes a machining program 200 from a memory (not illustrated), generates command data for driving each servomotor or spindle motor included in the machine based on an analysis result, and performs machining control to control the machine based on the command data. The controller 100 is function means implemented by the CPU 11 that executes analysis machining illustrated in FIG. 1, the axis control circuit 30 that controls each axis, the servo amplifier 40, the spindle control circuit 60, the spindle amplifier 61, etc.

The data accumulation unit 120 is function means that accumulates information related to machining by machining control of the machine in the data storage unit 210 when the machining control is performed by the numerical controller 1. The data accumulation unit 120 may automatically accumulate the information related to the machining in the data storage unit 210 each time the machining control of the machine is performed by the numerical controller 1, or accumulate the information related to the machining in the data storage unit 210 only when the operator commands accumulation. The data accumulation unit 120 includes an actual machining delay time measurement unit 121.

The actual machining delay time measurement unit 121 measures an actual delay time of servo control and machine motion for each combination of respective program commands included in the machining program 200 and stores the measured actual delay time in the data storage unit 210 when machining control of the machine based on the machining program 200 is performed by the controller 100.

FIG. 3 is a diagram for description of a method of measuring the actual delay time of the servo control and the machine motion by the actual machining delay time measurement unit 121. When a program command for axis control included in a machining program is executed, the program command is analyzed in the numerical controller 1, and a movement amount for each control period output to the servo motor is generated based on an analysis result. The generated movement amount for each control period is output to the servo motor though the axis control circuit and the servo amplified for each control period, the servo motor moves by the movement amount for each control period, and feedback of a position/speed is returned from the servo motor to the axis control circuit. However, for various reasons (a delay of movement, transitional motion at the time of acceleration and deceleration, etc.), a gap is generated between a position to which the servomotor needs to originally move in a control period thereof and an actual position of the servo motor, and a movement amount for each control period corresponding to the amount of the gap is generated as an error amount and output to correct displacement of the position in a subsequent control period.

The actual machining delay time measurement unit 121 monitors an output status of a movement amount and an output status of an error amount for each control period for each program command to measure a time at which only the error amount is output without the movement amount for each control period being output, and stores the measured time in the data storage unit 210 as an actual delay time of servo control and machine motion with respect to a combination of program commands executed before and after the time.

For example, the actual machining delay time measurement unit 121 uses a real time clock (RTC), etc. (not illustrated) incorporated in the numerical controller 1 to measure a time.

FIG. 4A and FIG. 4B are diagrams illustrating examples of the actual delay time of the servo control and the machine motion for each combination of program command types stored in the data storage unit 210. In the example illustrated in FIG. 4A, the actual machining delay time measurement unit 121 stores a value obtained by accumulating actual delay times of servo control and machine motion measured with respect to each combination of program commands for each combination of program command types together with the number of times of measurement. In this way, for example, it is possible to estimate a delay time of servo control and machine motion generated between a command G00 and a command G01 to be cumulative delay time/the number of times of measurements. With regard to a combination of program command types other than types of program commands illustrated in FIG. 4, an actual delay time of servo control and machine motion may be measured and stored.

In addition, since a delay time of servo control and machine motion depends on a weight of a moved axis, a weight of a workpiece may be acquired at the same time when the actual machining delay time measurement unit 121 measures an actual delay time of servo control and machine motion, and an actual delay time of servo control and machine motion may be stored for each (range of) weight of the workpiece as illustrated in FIG. 4B.

The weight of the workpiece may be acquired from drawing data, etc. used for machining or may be input by the user when machining is performed.

The machining time prediction unit 110 is function means that predicts a machining time based on an actual delay time of servo control and machine motion for each combination of program command types stored in the data storage unit 210. The machining time may be predicted by the machining time prediction unit 110 with regard to all blocks included in the machining program 200 before machining control by the controller 100 based on the machining program 200 starts. The machining time prediction unit 110 includes a reference machining time prediction unit 111, a program analysis unit 112, and a correction time calculation unit 113.

The reference machining time prediction unit 111 analyzes the machining program 200 corresponding to a machining time prediction target, and predicts a machining time not considering a delay time of servo control and machine motion involved in machining based on the machining program 200. For example, the conventional technologies disclosed in JP 2003-175439 A and JP 2012-243152 A may be used to predict the machining time not considering the delay time of the servo control and the machine motion.

Figure 5:
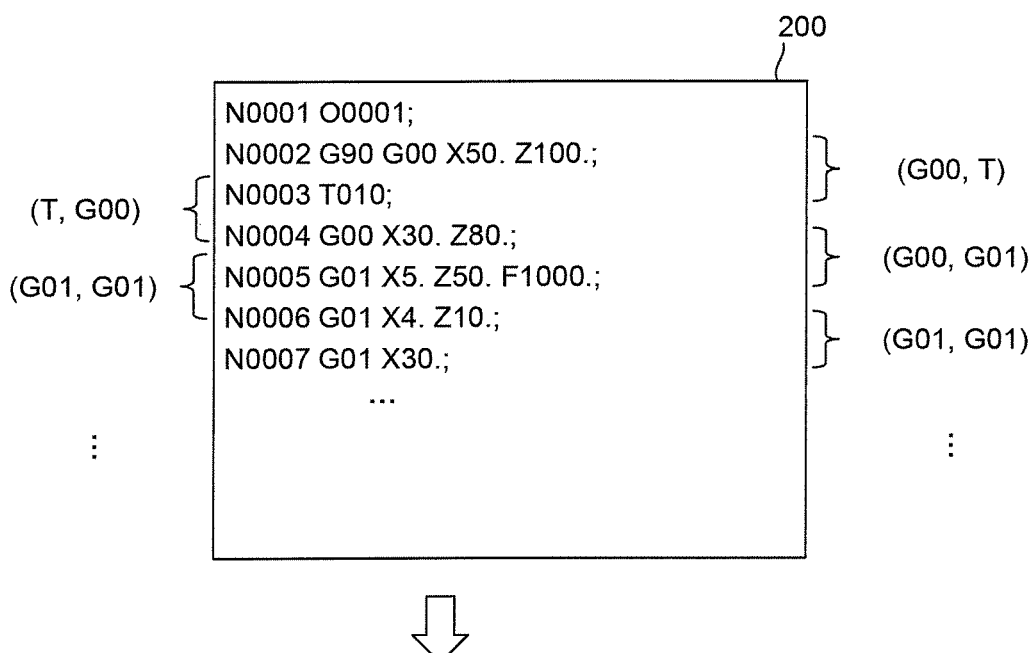
FIG. 5 is a diagram illustrating an example of a combination of program commands extracted from a machining program by a program analysis unit.

The program analysis unit 112 analyzes the machining program 200 corresponding to a machining time prediction target, and extracts all combinations of the program commands included in the machining program 200. As illustrated in FIG. 5, the program analysis unit 112 sequentially extracts two consecutive program commands in order from a head of the machining program 200 as a set of program commands.

The correction time calculation unit 113 estimates a delay time of servo control and machine motion generated between combinations of the respective program commands based on an actual delay time of servo control and machine motion for each combination of program command types stored in the data storage unit with regard to each combination of program commands extracted by the program analysis unit 112. For example, when an actual delay time of servo control and machine motion for each combination of program command types illustrated in FIG. 4A is stored, the correction time calculation unit 113 estimates a delay time of servo control and machine motion generated between a block N0004 and a block N0005 illustrated in FIG. 5 to be 21,425/105≈204.0 [ms] with reference to a column of a combination of program command types (G00, G01) of FIG. 4A. When a combination of program command types corresponding to the combination of the program commands extracted by the program analysis unit 112 is not stored in the data storage unit 210, the correction time calculation unit 113 estimates that a delay time of servo control and machine motion is not generated in the combination of the program commands. Then, the correction time calculation unit 113 calculates a correction time by integrating the delay time of the servo control and the machine motion estimated with regard to each combination of the program commands extracted by the program analysis unit 112.

Then, the machining time prediction unit 110 calculates a predicted machining time considering a delay time of servo control and machine motion by adding the correction time calculated by the correction time calculation unit 113 to a machining time not considering a delay time due to a machine delay involved in machining based on the machining program 200 calculated by the reference machining time prediction unit 111.

In the numerical controller 1 having such a configuration, an actual delay time of servo control and machine motion for each combination of program command types measured in actual machining by machining control of the machine performed in the past is stored in the data storage unit 210, and a machining time considering a delay time of servo control and machine motion may be predicted with reference to the data storage unit 210 in subsequent machining. Thus, it is possible to predict a machining time at high accuracy when compared to a conventional technology. When an actual delay time of servo control and machine motion for each combination of program command types is not stored in the data storage unit 210 in an initial operation of the numerical controller, there is a problem that a machining time may not be predicted at high accuracy. However, it is possible to easily cope with such a problem by transmitting and using an actual delay time of servo control and machine motion for each combination of program command types from the data storage unit 210 included in another same type of numerical controller, or by providing data of an actual delay time of servo control and machine motion for each combination of program command types prepared by a manufacturer of the numerical controller.

Even though the embodiments of the invention have been described so far, the invention is not limited only to the examples of the above-described embodiments, and can be implemented in various modes by making appropriate changes.

For example, even though an example of predicting a machining time through the blocks of the entire machining program has been described in the above-described embodiments, for example, a machining time may be predicted only for some block groups having acceleration and deceleration. In addition, even though a configuration of including the data storage unit 210 in the numerical controller has been described in the above-described embodiments, it is possible to adopt a configuration in which the data storage unit 210 is provided in a host computer in a factory and shared by respective numerical controllers, and the respective numerical controllers refers to/updates data stored in the data storage unit provided in the host computer via a network. Further, it is possible to adopt a configuration in which the data storage unit is provided on a server installed by the manufacturer of the numerical controller, and may be shared among numerical controllers of clients.

In the above-described embodiments, an embodiment in which both the machining time prediction unit 110 and the data accumulation unit 120 are included has been described. However, for example, if sufficiently reliable data is accumulated in the data storage unit 210 in advance, when the configuration of the data accumulation unit 120 is omitted and only the machining time prediction unit 110 (each function means included in the machining time prediction unit 110) and the data storage unit 210 are mounted on the numerical controller 1, the numerical controller 1 may be used as the numerical controller 1 that predicts a machining time at high accuracy. In this case, even though the data storage unit 210 is not newly updated, when machining using the same machine is performed, it is possible to predict a machining time at sufficiently high accuracy without updating the data storage unit 210 (adjustment of data according to an environment).

Further, the above-described embodiments describe a configuration in which the machining time prediction unit 110 and the data accumulation unit 120 have different functions means. However, it is not necessary to have such an inclusion relation, and a function and effect of the invention are not changed even when each function means is mounted as an independent function means.

Even though the embodiments of the invention have been described above, the invention is not limited only to the examples of the above-described embodiments, and can be implemented in various modes by making appropriate changes.

The invention claimed is:

1. A numerical controller for machining a workpiece by controlling a machine including at least one axis based on a machining program, the numerical controller comprising:
a processor configured to: predict a reference machining time corresponding to a machining time not considering a delay time of servo control and machine motion based on the machining program;
extract combinations of program commands included in the machining program by analyzing the machining program, each of the combinations including commands from at least two different blocks of the machining program;
store, in a memory device, information related to an actual delay time of servo control and machine motion measured in actual machining by the machine for of the combinations;
calculate a correction time for correction of the reference machining time based on each of the combinations and information related to an actual delay time of servo control and machine motion for each of the combinations;
calculate a predicted machining time obtained by correcting the reference machining time using the correction time; and control at least one of a servo motor or a spindle motor of the machine based on the predicted machining time; and
measure an actual delay time of servo control and machine motion for each combination of program commands and update the information related to the actual delay time of servo control and machine motion for each combination of the program command types stored in the memory device based on the measured actual delay time of servo control and machine motion for each combination of program commands.

2. A numerical controller for machining a workpiece by controlling a machine including at least one axis based on a machining program, the numerical controller comprising:
a processor configured to: predict reference machining time corresponding to a machining time not considering a delay time of servo control and machine motion based on the machining program;
extract combinations of program commands included in the machining program by analyzing the machining program, each of the combinations including commands from at least two different blocks of the machining program;
store, in a memory device, information related to an actual delay time of servo control and machine motion measured in actual machining by the machine for of the combinations;
calculate a correction time for correction of the reference machining time based on each of the combinations and information related to an actual delay time of servo control and machine motion for each of the combinations;
calculate a predicted machining time obtained by correcting the reference machining time using the correction time; and control at least one of a servo motor or a spindle motor of the machine based on the predicted machining time; and
calculate the correction time by estimating a delay time of servo control and machine motion with regard to each combination of the program commands extracted based on the information related to the actual delay time of servo control and machine motion for each combination of the program command types stored in the memory device and integrate each estimated delay time of servo control and machine motion.

* * * * *